W. C. AND E. E. STRAUSS.
MEANS FOR PREVENTING UNAUTHORIZED VIEWING OF A SURFACE.
APPLICATION FILED JULY 9, 1921.
1,435,992.                                   Patented Nov. 21, 1922.
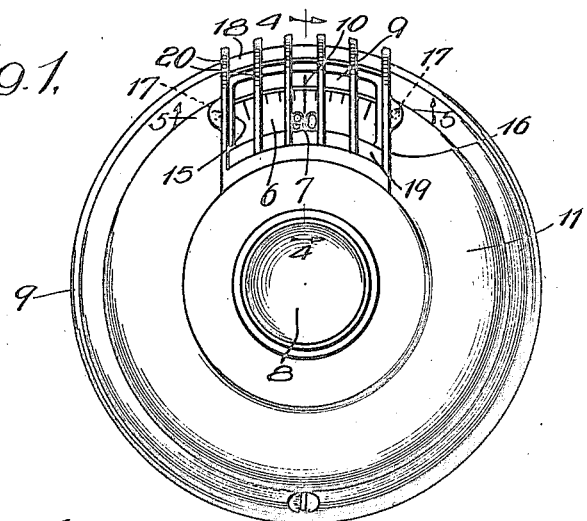
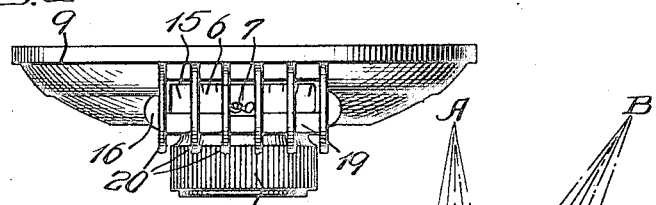
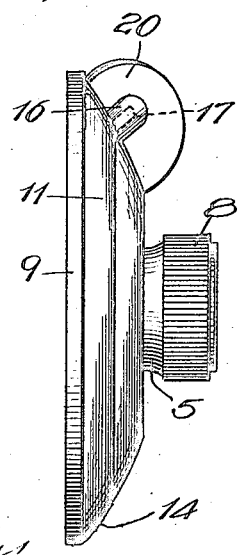
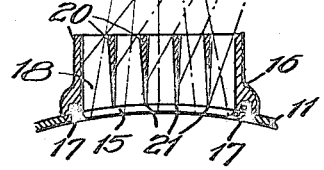
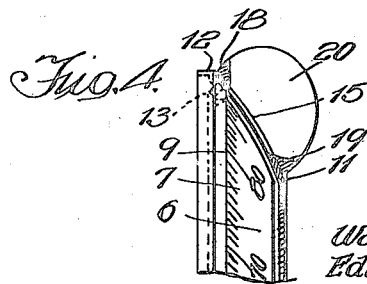
Witnesses:
W. P. Kilroy
Harry R. L. White
Inventors
Walter C. Strauss
Edward E. Strauss Patented Nov. 21, 1922.

1,435,992

UNITED STATES PATENT OFFICE.

WALTER C. STRAUSS AND EDWARD E. STRAUSS, OF CHICAGO, ILLINOIS.

MEANS FOR PREVENTING UNAUTHORIZED VIEWING OF A SURFACE.

Application filed July 9, 1921. Serial No. 483,591.

*To all whom it may concern:*

Be it known that we, WALTER C. STRAUSS and EDWARD E. STRAUSS, citizens of the United States, both residing at Chicago, in the county of Cook and State of Illinois, have invented a certain new and useful Improvement in Means for Preventing Unauthorized Viewing of a Surface, of which the following is a full, clear, concise, and exact description, reference being had to the accompanying drawings, forming a part of this specification.

Our invention relates to means for preventing unauthorized viewing of a surface, and more particularly to a blinder arrangement for preventing the theft of the combination of locks of the permutation or combination type, such as are commonly employed in connection with safes, vaults, and the like.

It is a familiar fact that the combinations of such locks are subject to theft by unauthorized viewing of the successive registrations of the markings by means of which the lock is opened. For example, it has heretofore been a simple matter where such a lock is opened in the presence of other persons, for any of such persons to take down the combination from a point removed from the operator's position, and thereafter gain unauthorized access to the safe or vault as the case may be.

Our invention aims to provide a novel, simple and inexpensive blinder arrangement, which will without materially impairing or interfering with the operator's vision of the markings in opening the lock, effectively prevent unauthorized viewing of the combination markings or indicia as they are moved into successive registration with the usual fixed markings to open the lock.

In accordance with the teachings of our invention, a plurality of outstanding blinders or grids are arranged across the surface unauthorized viewing of which it is desired to prevent. These blinders or grids extend out such a distance and are so spaced that the angle of vision by means of which a view of the surface may be had, is possible only from the position occupied by the operator in opening the lock. The markings or indicia about the dial of the lock are preferably covered by a suitable shield having a viewing opening across which the outstanding blinders or grids extend.

While our invention is particularly adapted for protecting or guarding the combination of a lock, it is applicable wherever the prevention of unauthorized viewing of a surface is desired, and we do not intend, therefore, to limit the invention to a particular use or purpose, nor to the details of the particular embodiment shown.

In order that those skilled in the art may be fully acquainted with the nature and scope of our invention, we shall now describe a specific embodiment of the invention in connection with the accompanying drawings, in which:

Figure 1 is a front elevational view of the dial of a lock with a shield and a blinder arrangement embodying our invention in place thereover;

Figure 2 is a top plan view of the same;

Figure 3 is a side elevational view;

Figure 4 is a fragmentary vertical sectional view through the shield and blinder arrangement along the line 4—4 of Figure 1 showing the dial of the lock in elevation; and Figure 5 is a fragmentary horizontal sectional view taken substantially on the line 5—5 of Figure 1.

With reference now to the drawings, 5 designates the usual operating spindle for unlocking the lock. This spindle 5 carries a disk or dial 6 having a system of markings and numbers arranged about the rim thereof as shown at 7, and is provided at its outer end with a knob or finger piece 8. The knob or finger piece 8 provides for turning the disk or dial 6 relative a surface 9 circumscribing the periphery thereof to move certain of the markings 7 (depending upon the combination of the lock) into registration with a mark 10 on the surface 9 to release the locking mechanism and leave the bolt of the lock free to move as is well understood in the art.

A shield in the nature of a dished ring 11 mounted upon the surface 9 covers the markings and numbers 7 arranged about the rim of the dial 6, and it is behind this shield 11 that the dial 6 is turned through that combination system by which the lock is opened. To facilitate mounting of the shield 11, the surface 9 is in the present instance, provided with an annular shoulder 12 for receiving the outer edge of the shield. An inwardly projecting pin 13 carried by the shield 11 is insertable into a cooperating opening in the surface 9 to position and maintain the proper positioning of the shield thereupon. The shield 11 may be secured by a screw 14 or any other suitable fastening means to the dial 9 or surrounding surface as desired. The particular formation and mounting of the shield may of course be varied. An arcuate opening 15 through the shield 11 forms a viewing opening through which the successive registrations of the markings 7 with the marking 10 are viewed by the operator in opening the lock.

The blinder arrangement of our invention in the particular instance shown is in the nature of a casting 16 secured over the viewing opening 15 by means of a pair of suitable screws 17, the heads of which engage in the shield or cover ring 11. The casting 16 comprises an upper marginal portion 18 extending along the upper edge of the arcuate opening 15, a lower marginal portion 19 extending along the lower edge of such opening, and a plurality of substantially parallel outstanding blinders or grids 20 extending across the opening 15. The blinders or grids 20 may be partially encased if so desired. While in the particular embodiment shown, the blinder arrangement is in the nature of a separate piece 16 secured to the shield 11, the blinders may be formed integral with the shield or otherwise as desired. Where the piece 16 is cast, the inner edges of the blinders or grids 20 are preferably tapered to a knife edge, as shown at 21, so that their thickness will not materially interfere with the operator's view of the markings. However, the blinders or grids 20 may be in the nature of sheet metal leaves suitably secured in place, in which event such tapering of the inner edges would not be necessary. We do not of course, intend to limit the invention to the particular arrangement of the blinders 20 shown. These blinders may be arranged otherwise than vertically across the surface 9 and need not necessarily extend in parallel relation.

In either event, it will now be apparent that while the operator from his position A (Fig. 5) is afforded a perfect vision, not only of the markings 7 immediately adjacent the marking 10, but of a sufficient number of markings 7 to either side of the marking 10 so that he will be apprised at all times of the particular marking moving into and out of register with the marking 10 before registration is had. Substantially all lines of vision from positions, such as B other than that of the operator as for example to either side of him, are screened from the dial 6 by the outstanding blinders, grids or leaves 20. While, of course, not especially necessary, the opposite surfaces of the blinders 20 are preferably so finished that there will be no appreciable reflection of the markings on the dial 6 and the surface 9 therethrough.

Frequently, the dial of the lock is so positioned that the opening for viewing the same is either above or below the direct horizontal line of vision from the operator standing in front of the lock. To afford the operator proper vision in such event, the inner faces of the marginal portions 18 and 19 of the piece 16 are finished at an angle as shown in Figure 4.

We claim:

1. In combination, a surface to be viewed, a blinder arrangement for said surface, said blinder arrangement comprising a plurality of substantially parallel leaves arranged across the surface and projecting therefrom, the projection and spacing of said leaves being such that unauthorized vision is screened from the surface thereby.

2. In combination, a lock having an indicia bearing surface, a shield adapted for covering said indicia bearing surface of the lock, said shield having a viewing opening and blinder means arranged across said viewing opening for screening out unauthorized vision therethrough.

3. The combination with a surface having an area exposed to view of blinder means arranged across the exposed area of said surface for screening out unauthorized vision of said area.

4. In a blinder of the class described, an opening defining member, a plurality of substantially parallel blinder leaves arranged across the opening defined by said member to prevent unauthorized vision therethrough, the inner edges of said leaves being relatively thin so as to not interfere with authorized vision through said opening.

5. In combination, a surface to be viewed, a member having an opening arranged to permit viewing of said surface therethrough, and blinder means arranged across and dividing said opening to prevent unauthorized viewing of said surface therethrough.

6. In combination, a surface to be viewed, a member having an opening arranged to permit viewing of said surface therethrough, and a plurality of blinders arranged across and dividing said opening to prevent unauthorized viewing of said surface therethrough.

In witness whereof, we hereunto subscribe our names this 26th day of May, 1921.

WALTER C. STRAUSS.
EDWARD E. STRAUSS.